United States Patent
Brown, Sr.

(10) Patent No.: US 10,766,323 B2
(45) Date of Patent: Sep. 8, 2020

(54) TOW HITCH PLUG

(71) Applicant: Terry Michael Brown, Sr., Vincennes, IN (US)

(72) Inventor: Terry Michael Brown, Sr., Vincennes, IN (US)

( * ) Notice: Subject to any disclaimer, the term of this patent is extended or adjusted under 35 U.S.C. 154(b) by 0 days.

(21) Appl. No.: 16/263,104

(22) Filed: Jan. 31, 2019

(65) Prior Publication Data

US 2020/0247199 A1 Aug. 6, 2020

(51) Int. Cl.
*B60D 1/60* (2006.01)
*F16B 21/02* (2006.01)

(52) U.S. Cl.
CPC .............. *B60D 1/605* (2013.01); *F16B 21/02* (2013.01)

(58) Field of Classification Search
CPC ............ B60D 1/60; B60D 1/605; F16B 21/02
USPC ........ 411/132, 216, 221, 321, 349, 549, 551
See application file for complete search history.

(56) References Cited

U.S. PATENT DOCUMENTS

| | | | | |
|---|---|---|---|---|
| 815,627 | A * | 3/1906 | Oldham | F16L 37/252 285/111 |
| 3,179,367 | A * | 4/1965 | Rapata | A47B 57/52 248/239 |
| 3,473,432 | A * | 10/1969 | Joy | F16B 31/04 33/199 R |
| 3,747,168 | A * | 7/1973 | Snarskis | F16B 5/025 411/349 |
| 4,040,641 | A * | 8/1977 | Riecke | B60D 1/60 280/507 |
| 4,263,833 | A * | 4/1981 | Loudin | F16B 19/1081 411/41 |
| 4,465,312 | A * | 8/1984 | Werner | B60R 19/36 293/104 |
| 5,073,075 | A * | 12/1991 | Duran | F16B 5/10 411/349 |
| 5,343,720 | A * | 9/1994 | Slater | B60D 1/60 280/507 |
| 5,626,435 | A * | 5/1997 | Wohlhuter | B60D 1/52 280/416.1 |
| 6,199,892 | B1 * | 3/2001 | Dahl | B60D 1/60 280/292 |
| 6,227,017 | B1 * | 5/2001 | Igelmund | E05B 73/0005 70/14 |
| 6,286,392 | B1 * | 9/2001 | Smith | B67B 7/16 7/100 |
| 6,302,617 | B1 * | 10/2001 | Rumpp | B60D 1/52 285/401 |

(Continued)

*Primary Examiner* — Jacob D Knutson
*Assistant Examiner* — Maurice L Williams
(74) *Attorney, Agent, or Firm* — Oliff PLC; R. Brian Drozd

(57) ABSTRACT

Hitch plugs and methods for installing hitch plugs for covering an opening in a trailer hitch are provided. In one implementation, a tow hitch plug may include a body having an outer surface that may correspond to inner dimensions of a cavity of a tow hitch receiver of the trailer hitch. The tow hitch plug may include a flange connected to a front end of the body in embodiments. The flange may radially extend beyond the outer surface of the cylindrical body and a threaded hole may extend through the flange in embodiments. Also, in embodiments, the tow hitch plug may include an arm connected to an end of the body and a lock insert connected to the arm. In a locked state, the lock insert may be inserted through an opening in a bracket of the trailer hitch at a back end of the tow hitch receiver in embodiments.

20 Claims, 6 Drawing Sheets

(56) References Cited

U.S. PATENT DOCUMENTS

| | | | | |
|---|---|---|---|---|
| 6,428,031 B1* | 8/2002 | McCoy | ............... | B60D 1/075 224/519 |
| 7,740,267 B2* | 6/2010 | Kirtland | ............... | B60D 1/52 224/519 |
| 8,151,605 B1* | 4/2012 | Gustafson | ............... | B60D 1/60 280/507 |
| 8,465,043 B1* | 6/2013 | Buckert | ............... | B60D 1/60 280/507 |
| 2004/0104557 A1* | 6/2004 | Kaepp | ............... | B60D 1/485 280/495 |
| 2005/0178173 A1* | 8/2005 | Kuo | ............... | E05B 13/105 70/58 |
| 2018/0281536 A1* | 10/2018 | Harper | ............... | B60D 1/60 |

* cited by examiner

TOW HITCH PLUG

TECHNICAL FIELD

The present disclosure generally relates to trailer hitches and more particularly relates to tow hitch plugs and methods of installing tow hitch plugs onto a tow hitch receiver of a trailer hitch.

BACKGROUND

In some situations, small loads can be carried within the cabin of a vehicle or within a trunk of the vehicle. Many types of vehicles (e.g., pick-up trucks, sport utility vehicles (SUVs), and other large vehicles) may be specifically designed to transport larger loads. However, some loads may be much too large, bulky, or heavy to be transported within the regular loading areas of these vehicles. Thus, these larger loads normally cannot be transported unless they are carried on a trailer that can be towed behind the vehicle.

In order to enable towing, trailer hitches are attached to the frame (or bumper) of a towing vehicle. Various types of towing components (such as ball mount brackets, trailer balls, couplers, trailers, safety chains, etc.) can be removably connected to these trailer hitches as needed for towing different types of loads. For example, a hitch mount, which may be configured for mounting a trailer ball, may be connected to the trailer hitch using a hitch pin. The hitch mount, which may be made of stainless steel, may be inserted into a tow hitch receiver of the trailer hitch and then twisted such that a spring-loaded locking pin extends into a groove to prevent the hitch mount from rotating farther, and hence locking the hitch mount to the tow hitch receiver. Of course, when the vehicle is not towing a load, the towing components can be disconnected from the receiver tube of the trailer hitch, such as by removing the spring-loaded locking pin from the groove to allow the hitch mount to be rotated to a point where it can be removed from the receiver tube.

However, when the towing equipment is disconnected from the trailer hitch, the receiver tube of the trailer hitch is exposed. Often, with the receiver tube exposed, the cavity of the receiver tube may become filled with undesirable objects. For example, when a vehicle is used on a construction site or on dirt roads, the receiver tube may become filled with dirt or mud. The vehicle may also be exposed to ice and snow, which can accumulate in the receiver tube. Also, it is possible that insects, such as hornets, wasps, ants, etc., or small animals or birds may build nests inside the receiver tubes. Thus, the design of these receiver tubes may lead to the undesirable accumulation of various matter or objects that would need to be removed before the trailer hitch can be used for its intended purpose of towing a load.

There is therefore a need to prevent this accumulation of undesirable matter inside the receiver tube of a trailer hitch.

SUMMARY

Tow hitch plugs, which are configured for covering a cavity in a tow hitch receiver of a trailer hitch, are provided in the present disclosure. According to one embodiment, a tow hitch plug includes a body having an outer surface that substantially conforms to inner dimensions of the cavity of the tow hitch receiver of the trailer hitch. The tow hitch plug further includes a flange connected to a front end of the body, whereby the flange radially extends beyond the outer surface of the body. The flange further includes a threaded hole extending through the flange. Also, the tow hitch plug includes an arm connected to a back end of the body and a lock insert connected to the arm. In a locked state, the lock insert is inserted through an opening in a bracket of the trailer hitch at a back end of the tow hitch receiver.

According to one embodiment of a method of installing a hitch plug onto a tow hitch receiver of a trailer hitch, the method includes a step of inserting a lock insert of a hitch plug into a cavity of the tow hitch receiver. A further step includes pushing the lock insert through an opening in a bracket of the trailer hitch, whereby the bracket is configured to support the tow hitch receiver. The method further includes a step of rotating the hitch plug such that the lock insert is locked against an inside surface of the bracket. Also, the method includes screwing a set screw through a flange in the hitch plug such that the set screw extends into a groove on a front face of the tow hitch receiver.

DETAILED DESCRIPTION OF EMBODIMENTS

During times when a trailer hitch is not being used for towing, plugging a cavity of the trailer hitch may be desirable to prevent unwanted material, objects, animals, or insects from accumulating or nesting inside the cavity. Although some plugs have been used for such a purpose, many plugs are simply inserted into the cavity without a way to keep the plug in place within the cavity. Therefore, an improvement to conventional trailer hitch plugs are described herein, whereby the tow hitch plugs of the present disclosure may be inserted and locked into place, thereby helping to better seal the opening and improve the ability to prevent mud, dirt, snow, ice, insects, birds, or other undesirable objects from filling the cavity.

Thus, by improving the plugging capabilities as described herein, the tow hitch plugs of the present disclosure are able to provide better protection to the interior of the trailer hitch cavities and providing cavities that will be cleaner for a person who may later wish to connect towing equipment. The cleanliness of the cavity may help to make the towing connections simpler. Furthermore, by preventing the accumulation of matter such as ice, snow, mud, dirt, etc., the tow hitch plugs can prevent the development of rust or corrosion of metal parts of the trailer hitches.

Figure 1:
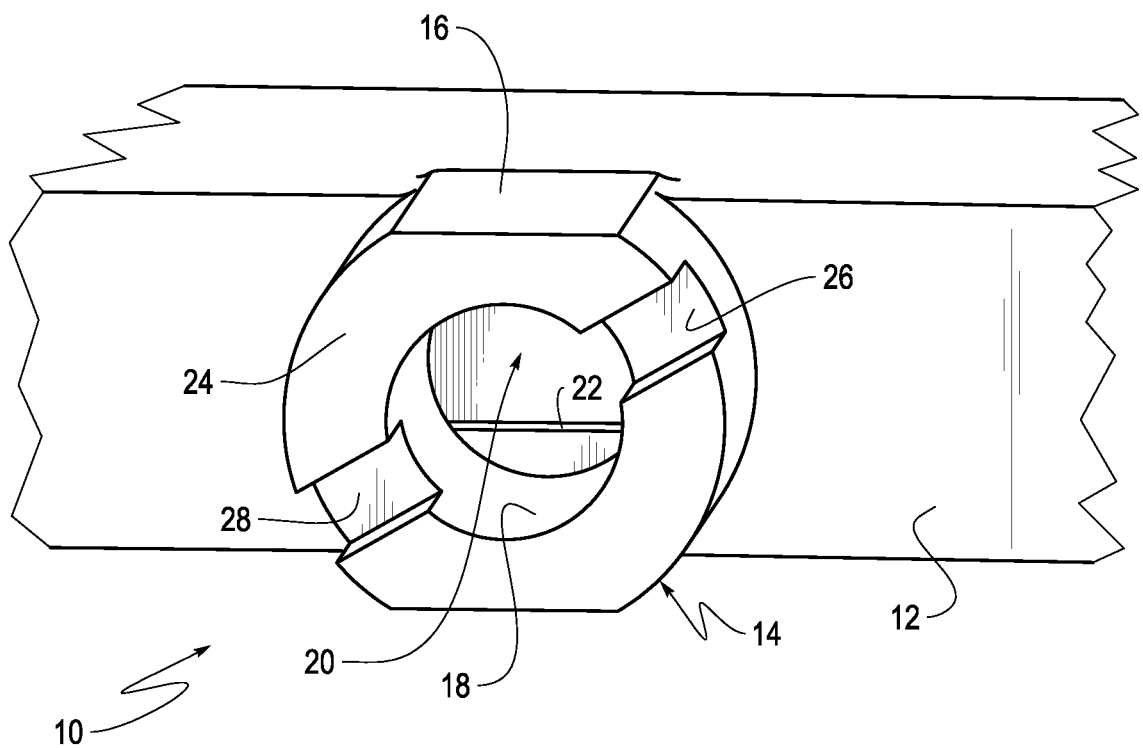
FIG. 1 is a perspective view of a portion of a trailer hitch, according to one embodiment.

FIG. 1 is a perspective view showing an embodiment of a portion of a trailer hitch 10, which may be mounted on the frame of a vehicle (not shown). The trailer hitch 10 in this embodiment includes a bracket 12, or tow bar, which is attached directly to the vehicle and a tow hitch receiver 14 connected to the bracket 12. In some embodiments, the tow hitch receiver 14 may be welded to the bracket 12. The tow hitch receiver 14 is configured to be connected to various types of towing equipment to allow the vehicle to tow a trailer or other load.

The tow hitch receiver 14 includes a hitch tube 16, which, in this embodiment, has a cylindrical cavity 18. According to other embodiments, the hitch tube 16 may have a substantially square cavity for acceptable other specific types of trailer equipment.

Figure 2:
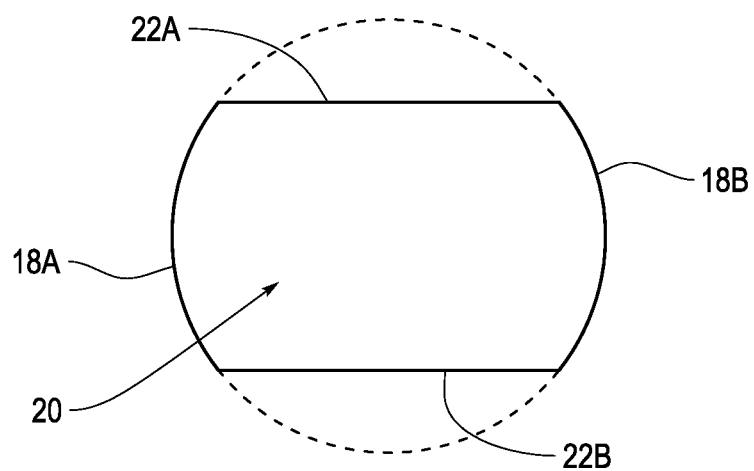
FIG. 2 is a diagram illustrating an opening in a bracket of the trailer hitch of FIG. 1.

As illustrated in FIG. 1, the tow hitch receiver 14 intersects the bracket 12 at an opening in the bracket 12 such that a rear opening 20 at the back of the cylindrical cavity 18 is formed. A portion of an edge 22 of the opening in the bracket 12 is shown in FIG. 1. As shown in FIG. 2, the rear opening 20 is defined by the edge 22, which includes a top edge 22A and a bottom edge 22B. The opening in the bracket 12 further includes a left back edge 18A of the cylindrical cavity 18 and a right back edge 18B of the cylindrical cavity 18.

It should be understood that the trailer hitch 10 described with respect to FIGS. 1 and 2 represent one of multiple embodiments of trailer hitches currently in use. As mentioned above, the design of this trailer hitch 10 and the designs of other known trailer hitches are such that when the trailer hitch 10 is not connected to towing equipment, the empty trailer hitches have a cavity (e.g., cylindrical cavity 18). When the vehicle is used without the towing equipment, mud, dirt, grime, snow, ice, etc. may accumulate in the cavity. Thus, when the user wishes to connect the towing equipment to the trailer hitch, the cavity may be clogged and may require time and effort to clear out the cavity before the vehicle can be used for towing.

Thus, because of these inherent issues of typical trailer hitches, one solution is to use a plug that can prevent the cavity from accumulating unwanted mud, dirt, grime, snow, and ice. Then, when it is time to connect the towing equipment, the plug can be removed from the cavity and the towing equipment can be easily inserted into a relatively clean cavity of the towing hitch. According to the teachings of the present disclosure, the hitch plugs described below may be used to plug up the cavity to keep the inside of the cavity of the trailer hitch relatively clean and free of excessive amounts of dirt, mud, grime, snow, and ice.

Figure 3:
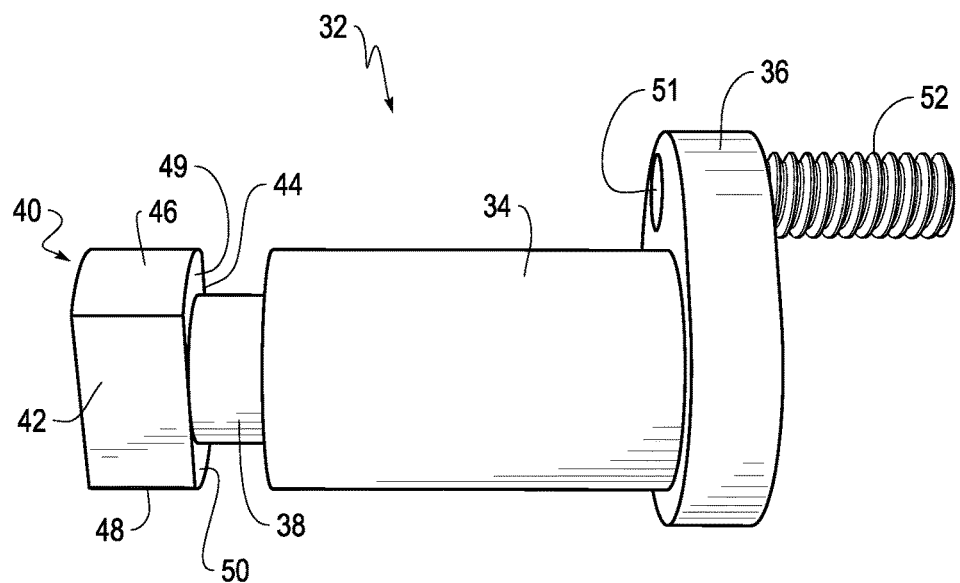
FIG. 3 is a perspective view of a tow hitch plug, according to various embodiments of the present disclosure.
Figure 4:
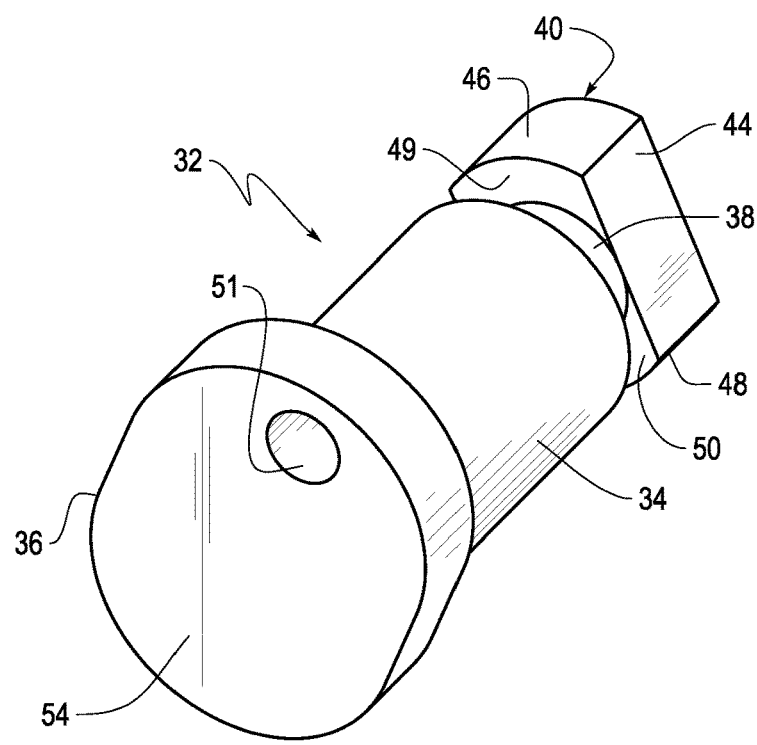
FIG. 4 is an isometric view of the tow hitch plug of FIG. 3.
Figures 5, 6, 7:
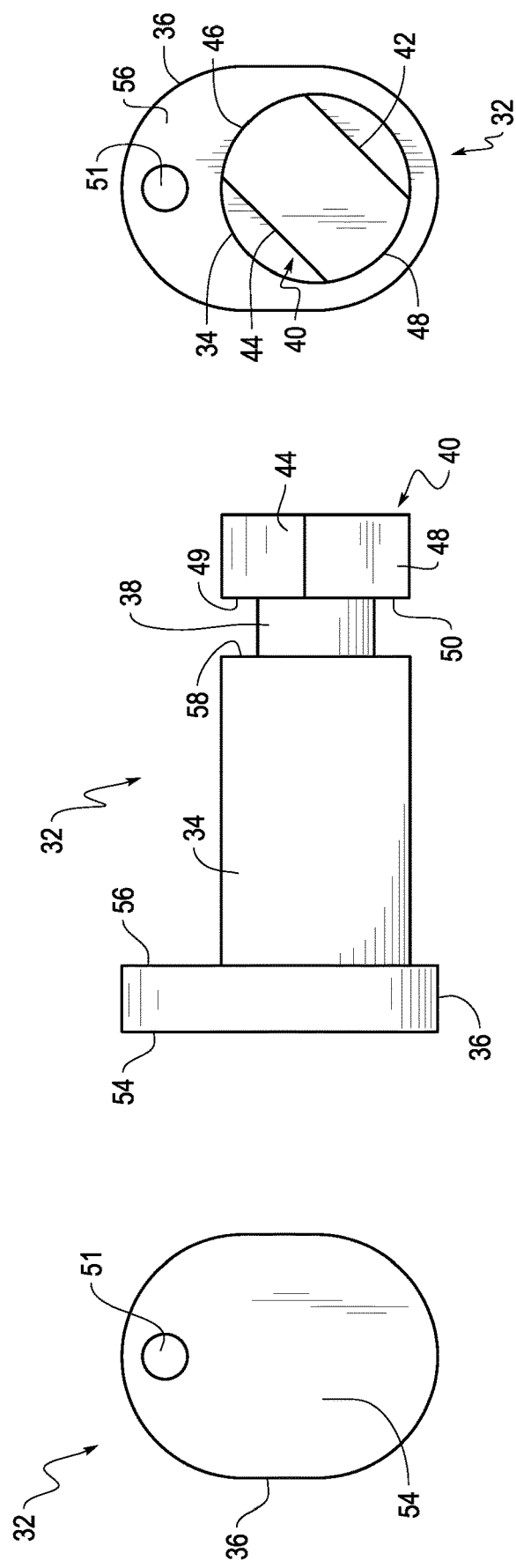
FIG. 5 is a front view of the tow hitch plug of FIG. 3.
FIG. 6 is a side view of the tow hitch plug of FIG. 3.
FIG. 7 is a back view of the tow hitch plug of FIG. 3.

FIG. 3 is a perspective view of one embodiment of a tow hitch plug 32. In addition, FIG. 4 is an isometric view of the tow hitch plug 32 of FIG. 3; FIG. 5 is a front view of the tow hitch plug 32; FIG. 6 is a side view of the tow hitch plug 32; and FIG. 7 is a back view of the tow hitch plug 32. According to this embodiment, the hitch plug 32 may generally be defined as comprising a cylindrical body 34, a flange 36, an arm 38, and a lock insert 40.

In some embodiments, these components of the hitch plug 32 may be formed as a unitary device. For example, the unitary device may be constructed of a thermoplastic polyethylene, such as ultra-high-molecular-weight (UHMW) polyethylene. The UHMW polyethylene material may also act as a bumper that is softer than the metal material of the tow hitch receiver 14.

The tow hitch plug 32 is configured for covering a cavity (e.g., the cylindrical cavity 18) in a tow hitch receiver (e.g., tow hitch receiver 14) of a trailer hitch (e.g., trailer hitch 10). According to the embodiment illustrated in FIGS. 3-7, the hitch plug 32 may be configured such that the flange 36 is connected axially to a front end of the body 34, the arm 38 connects axially to a back end of the body 34, and the lock insert 40 is connected axially to a back end of the arm 38. The cylindrical body 34 has an outer surface that substantially conforms to the inner surface of the cavity 18 of the tow hitch receiver 14 of the trailer hitch 10. The flange 36 is connected to a front end of the body 34 and radially extends beyond the outer surface of the body 34.

The arm 38 has a smaller diameter than the diameter of the cylindrical body 34. The step between the diameter of the arm 38 to the diameter of the cylindrical body 34 forms an abutment on the back end of the cylindrical body 34 that is configured to abut against the edge 22 of the rear opening 20. The diameter of the arm 38 may be slightly less than the distance between the top edge 22A and the bottom edge 22B of the rear opening 20. The axial length of the arm 38, which separates the cylindrical body 34 from the lock insert 40, may be slightly longer than the thickness of the walls of the bracket 12 defining the width of the edge 22.

The lock insert 40 may have a cross-sectional shape that is similar to the shape of the rear opening 20 and includes dimensions that are slightly smaller than the rear opening 20 to allow the lock insert 40 to be inserted through the rear opening 20 when the hitch plug 32 is inserted through the cavity 18 of the tow hitch receiver 14. Defining the cross-sectional shape, the lock insert 40 includes a bottom flat surface 42, a top flat surface 44, a left curved surface 46, and a right curved surface. The left curved surface 46 and right curved surface 46 may be configured to have the same or smaller dimensions as the diameter of the body 34 to allow the lock insert 40 to slide through the cylindrical cavity 18 of the tow hitch receiver 14 unhindered.

In a locked state, the lock insert 40 is inserted through the rear opening 20 in the bracket 12 of the trailer hitch 10 at a back end of the tow hitch receiver 14 and then the hitch plug 32 is rotated about its axis to move a first front surface 49 of the lock insert 40 behind the top edge 22A (or bottom edge 22B) of the rear opening 20 and to move a second front surface 50 of the lock insert 40 behind the bottom edge 22B (or top edge 22A) of the rear opening 20. When the first and second front surfaces 49, 50 of the lock insert 40 are positioned behind the top and bottom edges 22A, 22B, the hitch plug 32 is locked in the cavity 18.

The flange 36 further includes a threaded hole 51 that extends through the flange 36. When the hitch plug 32 is inserted into the cavity 18 such that the lock insert 40 is pushed through the rear opening 20, the hitch plug 32 is then rotated to lock the lock insert 40 within the rear opening 20. The hitch plug 32 is rotated until the threaded hole 51 is aligned with the first groove 26 (or second groove 28) on the front face 24 of the tow hitch receiver 14.

A set screw 52, having threads corresponding to threads of the threaded hole 51, is screwed through the hole 51 such that a back end of the set screw 52 extends into the first groove 26 (or second groove 28) while a front end of the set screw 52 remains in threaded connection with the hole 51. The set screw 52 may include an internal hex socket 70 (see FIG. 8) that allows the set screw 52 to be screwed into or out of the grooves 26, 28.

When the set screw 52 is positioned within one of the grooves 26, 28, the hitch plug 32 is unable to rotate and thus the hitch plug 32 remains locked with the lock insert 40 behind the rear opening 20 to prevent the hitch plug 32 from being removed from the cavity. When the set screw 52 is unscrewed such that it no longer extends in the groove 26, 28, then the hitch plug 32 can be rotated to a position where the lock insert 40 is aligned with the rear opening 20, allowing the user to remove the hitch plug 32 from the cavity 18.

In the locked state, the hitch plug 32 is rotated within the cavity 18 of the tow hitch receiver 14 to lock the lock insert 40 against an inside portion of the bracket 12 of the trailer hitch 10 and the set screw 52 is screwed through the threaded hole 51 to extend a forward end of the set screw 52 into a groove (e.g., groove 26 or 28) on the front face 24 of the tow hitch receiver 14.

Unlike conventional mounting bars that are installed on the hitch tube 16, the hitch plug 32 does not include spring-loaded locking pins. Instead, the hitch plug 32 described in the present disclosure includes the set screw 52 that can be screwed through the threaded hole 51 to extend into the groove 26, 28 for locking the hitch plug in a set position.

Also, the hitch plug 32 does not include any components that can be connected to other towing equipment for towing a load, but instead includes the flange 36. The flange 36 may be considered to act as a soft bumper for preventing damage to objects that may otherwise collide with the hard metal surfaces of the tow hitch receiver 14.

In some embodiments, the body 34 may have an outer surface that corresponds to the smallest dimensions of the interior surface of the cavity of the tow hitch receiver in which it is designed to plug. For example, if the interior surface of the cavity is square or substantially square, the body 34 may have a cylindrical outer surface that allows it to be rotated relatively freely within this square interior surface. In some cases, if the outer dimensions of the body 34 are similar to the interior dimensions of the cavity, the hitch plug (e.g., hitch plug 32) may be greased to allow the body 34 and lock insert 40 to easily slide through the cavity and to allow the hitch plug 32 to be easily removed when the trailer hitch 10 is to be used for towing.

The flange 36 is constructed such the dimensions on all sides of the flange 36 extend outward beyond the radius of the body 34. Thus, when the hitch plug 32 is inserted in the cavity 18 and the lock insert 40 is inserted through the rear opening 20 in the bracket 12, a back surface 56 of the flange 36 is configured to abut the front face 24 of the tow hitch receiver 14. Also, an exposed portion of a back end 58 of the body 34 is configured to abut the edges 22A, 22B of the rear opening 20.

Figure 8:
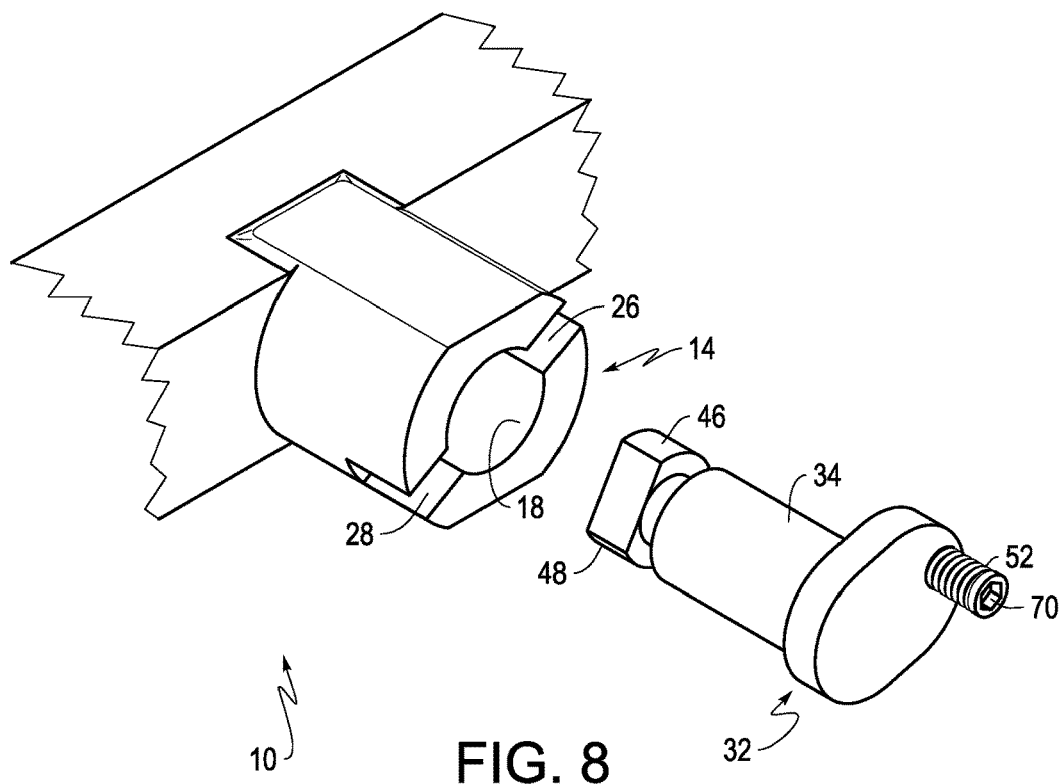
FIG. 8 is a perspective view of the tow hitch plug of FIG. 3 before installation into a cavity in the trailer hitch of FIG. 1, according to some embodiments.

FIG. 8 is a perspective view of the trailer hitch 10 shown in FIG. 1 and the tow hitch plug 32 shown in FIGS. 3-7 before the tow hitch plug 32 is installed into the cavity 18 in the tow hitch receiver 14 of the trailer hitch 10. It should be noted that the cylindrical body 34 and the curved surfaces 46, 48 of the lock insert 40 include a diameter that allows the tow hitch plug 32 to be inserted into the cavity 18. The tow hitch plug 32 may be rotated such that the lock insert 40 is aligned with the rear opening 20 so that the hitch plug 32 can be fully inserted into the cavity 18 to thereby position the back end 58 of the body 34 against the edges 22A, 22B and position the back surface 56 of the flange 36 against the front face 24.

Figure 9:
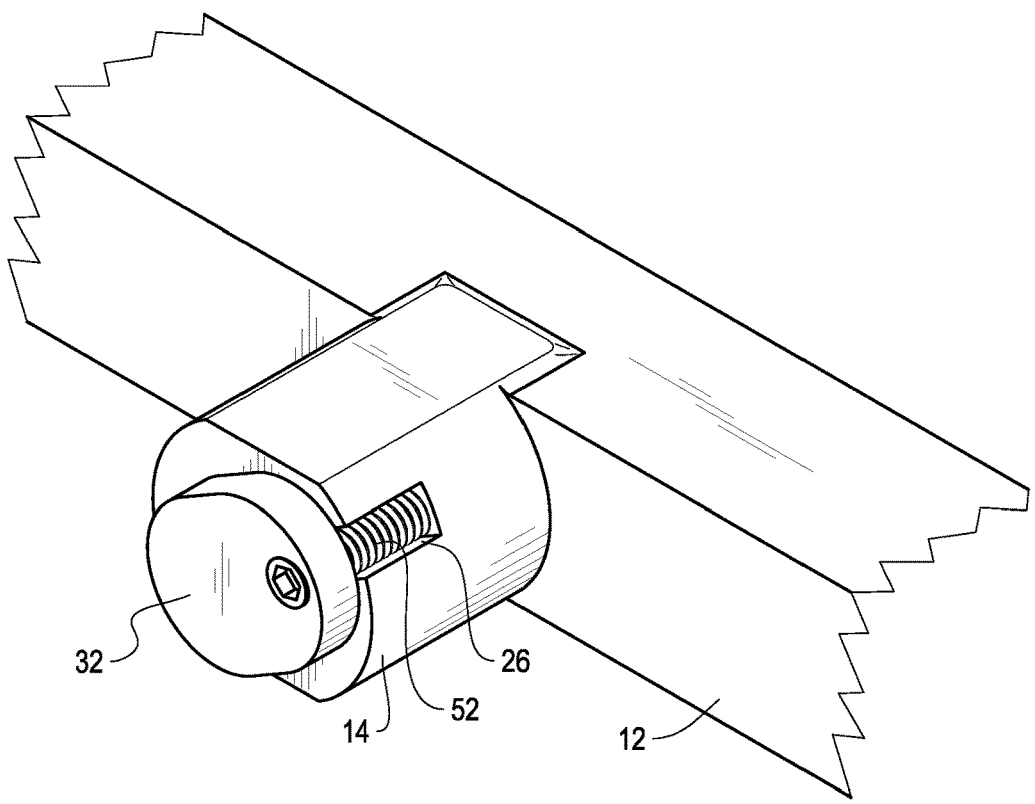
FIG. 9 is a perspective view of the tow hitch plug of FIG. 3 after installation into the cavity in the trailer hitch of FIG. 1, according to some embodiments.

In this position, the lock insert 40, having been pushed through the rear opening 20, is able to rotate freely behind the edges 22A, 22B to lock the hitch plug 32 against the front face 24. The hitch plug 32 can be further rotated until the threaded hole 51 is aligned with the groove 26 or 28. A tool (e.g., hex screw driver) can be used to engage with the internal hex socket 70 of the set screw 52 and to rotate the set screw 52 thereby driving the set screw into the groove 26, 28. When driven in the groove, the set screw 52 prevents the hitch plug 32 from rotating and keeps the lock insert 40 in the rotated position, locked behind the edges 22A, 22B of the rear opening 20. FIG. 9 is a perspective view showing the tow hitch plug 32 installed on the tow hitch receiver 14. Also, the set screw 52 is shown inserted in the first groove 26 to lock the hitch plug 32 in place.

As illustrated in FIGS. 3-9, the body 34 has a cylindrical outer surface that substantially conforms to an inner cylindrical surface of the cavity 18 of the tow hitch receiver 14 of the trailer hitch 10. The back end of the tow hitch receiver 14 may be welded onto the bracket 12 of the trailer hitch 10 such that a back end of the cavity 18 exposes the edges 22A, 22B of the opening in the bracket 12. The lock insert 40 includes outer dimensions defined by the cavity 18 (e.g., left and right back edges 18A, 18B) of the tow hitch receiver 14 and the edges (e.g., top and bottom edges 22A, 22B) of the opening in the bracket (e.g., rear opening 20). The arm 38 includes a maximum diameter defined by the distance between edges (e.g., top and bottom edges 22A, 22B) of the opening in the bracket. In the locked state, the back end 56 of the flange 36 may be flush against the front face 24 of the tow hitch receiver 14.

Figure 10:
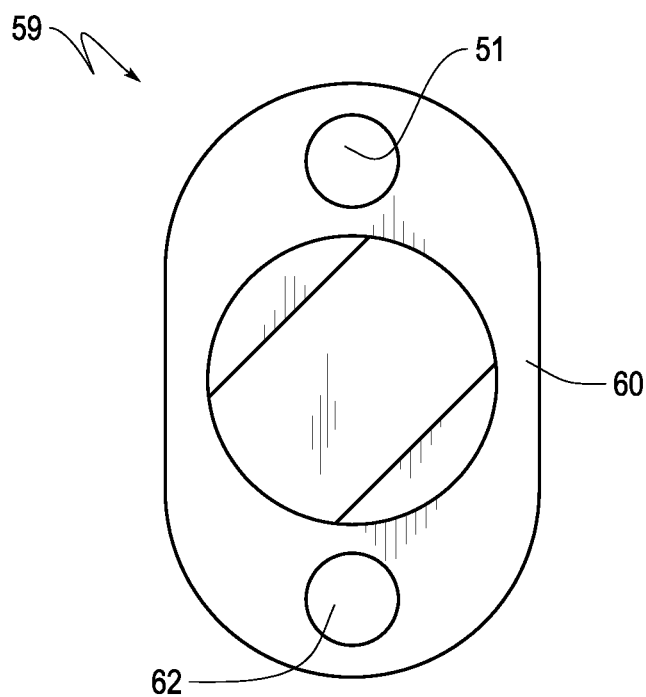
FIG. 10 is a back view of a tow hitch plug, according to a second embodiment.

FIG. 10 is a back view of a tow hitch plug 59 according to a second embodiment. In this embodiment, the tow hitch plug 59 may include the same components as the tow hitch plug 32 shown in FIGS. 3-9, except that a flange 60 of the tow hitch plug 59 is different. In this embodiment, the flange 60 is configured such that two tabs extend outward from a center location. Thus, in addition to the threaded hole 51 extending through a first tab as described above with respect to the first embodiment, the tow hitch plug 59 also includes a second threaded hole 62 that extends through a second tab.

A second set screw (not shown), similar to the set screw 52 described above, can be threaded through the second threaded hole 62 in order that the second set screw extends into the second groove 28 (or first groove 26) in the front face 24 of the tow hitch receiver 14. Therefore, in this embodiment, both grooves 26, 28 may be configured to receive the two set screws. Also, this embodiment may include a more aesthetically balanced look.

Figure 11:
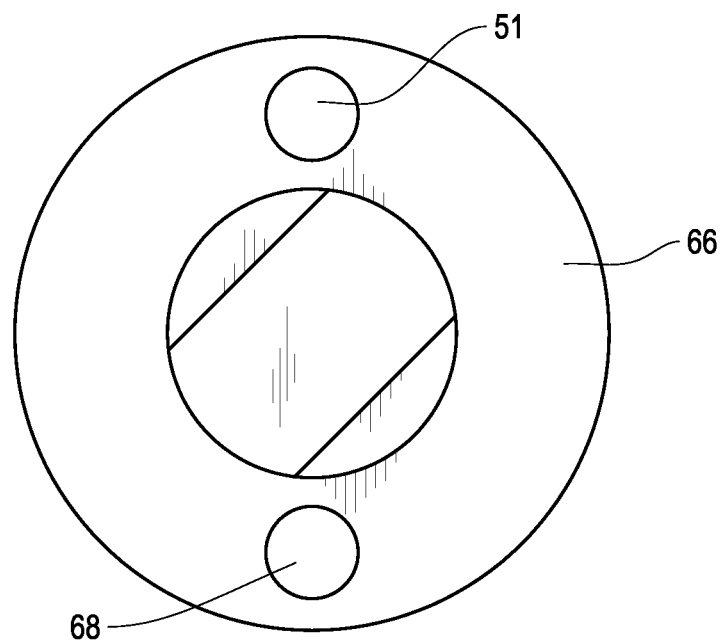
FIG. 11 is a back view of a tow hitch plug, according to a third embodiment.

FIG. 11 is a back view of a tow hitch plug 64 according to a third embodiment. In this embodiment, the tow hitch plug 64 may include the same components as the tow hitch plug 32 shown in FIGS. 3-9, except that a flange 66 of the tow hitch plug 64 is different. In this embodiment, the flange 66 is configured to uniformly extend outward from a center location beyond the body 34. In addition to the threaded hole 51 extending through the flange 36 as described above with respect to the first embodiment, the tow hitch plug 64 also includes a second threaded hole 68 that extends through the flange 66 on the other side of the flange 66 from the first threaded hole 51.

A second set screw (not shown), similar to the set screw 52 described above, can be threaded through the second threaded hole 68 in order that the second set screw extends into the second groove 28 (or first groove 26) in the front face 24 of the tow hitch receiver 14. Therefore, in this embodiment, both grooves 26, 28 may be configured to receive the two set screws. This embodiment may also include a more aesthetically balanced look than the embodiment described with respect to FIGS. 3-9.

Therefore, the hitch plug may further comprise a second set screw configured for threaded connection with a second threaded hole extending through the flange, the second set screw being screwed through the second threaded hole to extend a forward end of the second set screw into the second groove 28 on the front face 24 of the tow hitch receiver 14.

Figure 12:
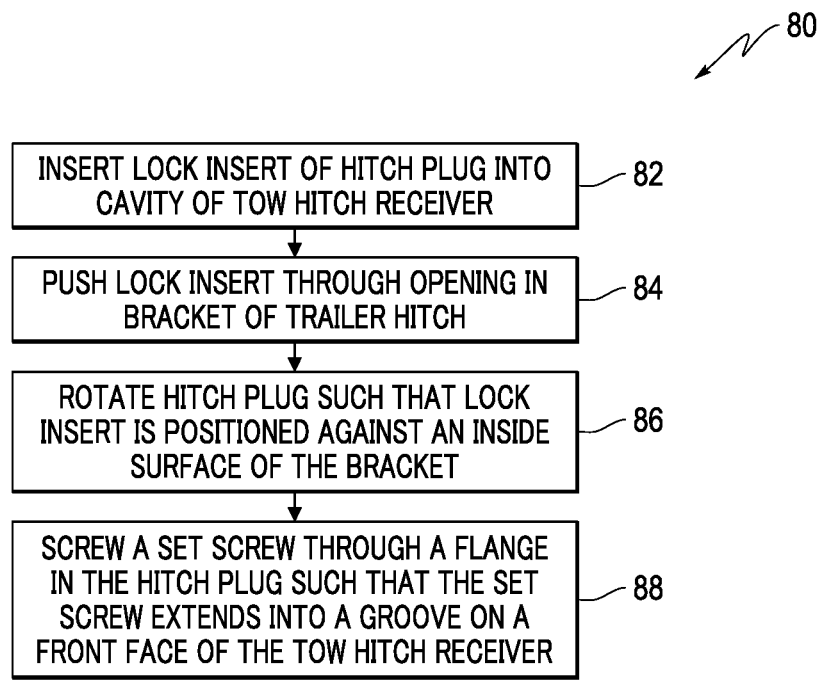
FIG. 12 is a block diagram illustrating a method for installing a tow hitch plug into a cavity of a trailer hitch, according to one embodiment.

FIG. 12 is a block diagram illustrating a method 80 for installing a tow hitch plug onto a tow hitch receiver of a trailer hitch. In the embodiment of FIG. 12, the method 80 includes a block 82 describing a step of inserting a lock insert of a hitch plug into a cavity of the tow hitch receiver. The method 80 further includes the step of pushing the lock insert through an opening in a bracket of the trailer hitch, as defined in block 84, whereby the bracket may be configured to support the tow hitch receiver. Furthermore, the method 80 may include the step of rotating the hitch plug such that a portion of the lock insert is positioned adjacent to an inside surface of the bracket, as defined in block 86. In some embodiments, the lock insert may be positioned against the inside surface of the bracket. Also, the method 80 includes block 88 that describes a step of screwing a set screw through a flange in the hitch plug such that a forward end of the set screw extends into a groove on a front face of the tow hitch receiver, thereby keeping the lock insert in a locked position.

In some embodiments, the method 80 may be defined such that the step described in block 88 is executed whereby positioning the set screw in the groove on the front face of the tow hitch receiver prevents the hitch plug from rotating to a position where the lock insert can be removed from the opening in the bracket of the trailer hitch. According to another embodiment, the block 88 of method 80 may further include an additional step of screwing a second set screw through the flange in the hitch plug such that the second set screw extends into a second groove on the front face of the tow hitch receiver.

The step defined in block 84 may further be defined such that pushing the hitch plug includes pushing until a back end of a cylindrical body of the hitch plug abuts the bracket. Also, prior to inserting the lock insert of the hitch plug into the cylindrical cavity of the tow hitch receiver as defined in block 82, an additional step of greasing the cylindrical body of the hitch plug may be performed to allow the cylindrical body to slide through the cylindrical cavity of the tow hitch receiver.

What is claimed is:

1. A tow hitch plug for covering a cavity in a tow hitch receiver of a trailer hitch, the tow hitch plug comprising:
    a body having an outer surface that corresponds to inner dimensions of the cavity of the tow hitch receiver of the trailer hitch;
    a flange connected to a front end of the body, the flange radially extending beyond the outer surface of the body, the flange further including a threaded hole extending through the flange;
    an arm connected to a back end of the body; and
    a lock insert connected to the arm;
    wherein, in a locked state, the lock insert is inserted through an opening in a bracket of the trailer hitch at a back end of the tow hitch receiver.

2. The tow hitch plug of claim 1, further comprising a set screw configured for threaded connection with the threaded hole.

3. The tow hitch plug of claim 2, wherein the set screw includes an internal hex socket.

4. The tow hitch plug of claim 2, wherein, in the locked state, the tow hitch plug is rotated within the cavity of the tow hitch receiver to lock the lock insert adjacent to an inside portion of the bracket of the trailer hitch and the set screw is screwed through the threaded hole to extend a forward end of the set screw into a groove on a front face of the tow hitch receiver.

5. The tow hitch plug of claim 4, further comprising a second set screw configured for threaded connection with a second threaded hole extending through the flange, the second set screw being screwed through the second threaded hole to extend a forward end of the second set screw into a second groove on the front face of the tow hitch receiver.

6. The tow hitch plug of claim 1, wherein the body, flange, arm, and lock insert are formed as a unitary component.

7. The tow hitch plug of claim 6, wherein the body, flange, arm, and lock insert comprise ultra-high-molecular-weight (UHMW) polyethylene.

8. The tow hitch plug of claim 1, wherein the body has a cylindrical outer surface that substantially conforms to an inner cylindrical surface of the cavity of the tow hitch receiver of the trailer hitch.

9. The tow hitch plug of claim 1, wherein the back end of the tow hitch receiver is welded to the bracket of the trailer hitch such that a back end of the cavity exposes edges of the opening in the bracket.

10. The tow hitch plug of claim 9, wherein the lock insert includes outer dimensions defined by the cavity of the tow hitch receiver and the edges of the opening in the bracket.

11. The tow hitch plug of claim 10, wherein the arm includes a diameter defined by the distance between edges of the opening in the bracket.

12. The tow hitch plug of claim 1, wherein, in the locked state, a back end of the flange is flush against a front face of the tow hitch receiver.

13. A method of installing a hitch plug onto a tow hitch receiver of a trailer hitch, the method comprising the steps of:
    inserting a lock insert of a hitch plug into a cavity of the tow hitch receiver;
    pushing the lock insert through an opening in a bracket of the trailer hitch, the bracket configured to support the tow hitch receiver;
    rotating the hitch plug such that the lock insert is positioned adjacent to an inside surface of the bracket; and
    securing a flange of the hitch plug using a fastener that extends through the flange, such that the flange is prevented from rotation relative to the bracket.

14. The method of claim 13, wherein the fastener comprises a set screw and the securing comprises screwing the set screw through the flange in the hitch plug such that the set screw extends into the groove on a front face of the tow hitch receiver, wherein the set screw extended in the groove on the front face of the tow hitch receiver prevents the hitch plug from rotating to a position where the lock insert can be removed from the opening in the bracket of the trailer hitch.

15. The method of claim 14, further comprising the step of screwing a second set screw through the flange in the hitch plug such that the second set screw extends into a second groove on the front face of the tow hitch receiver.

16. The method of claim 13, further comprising pushing the hitch plug until a back end of a cylindrical body of the hitch plug abuts the bracket.

17. A tow hitch plug comprising:
    a body having an outer surface that corresponds to inner dimensions of a cavity of a tow hitch receiver of a trailer hitch;
    a flange radially extending beyond the outer surface of the body;
    an arm connected to the body; and a lock insert connected to the arm, the lock insert being configured, in a locked state, to be inserted through an opening in a bracket of the trailer hitch at an end of the tow hitch receiver and rotated in the opening, wherein, in the locked state, the flange is configured so that rotation of the flange relative to the bracket is prevented thereby disallowing the lock insert to be rotated and removed from the bracket.

18. The tow hitch plug of claim 17, wherein, in the locked state, the tow hitch plug is rotated within the cavity of the tow hitch receiver to lock the lock insert adjacent to an inside portion of the bracket of the trailer hitch and a set screw is screwed through a threaded hole of the flange to extend a forward end of the set screw into a groove on a front face of the tow hitch receiver.

19. The tow hitch plug of claim 18, further comprising a second set screw configured for threaded connection with a second threaded hole extending through the flange, the second set screw being screwed through the second threaded hole to extend a forward end of the second set screw into a second groove on the front face of the tow hitch receiver.

20. The tow hitch plug of claim 17, wherein the end of the tow hitch receiver is welded to the bracket of the trailer hitch such that a back end of the cavity exposes edges of the opening in the bracket.

\* \* \* \* \*